US 9,378,158 B2

(12) United States Patent
Lichoulas et al.

(10) Patent No.: US 9,378,158 B2
(45) Date of Patent: Jun. 28, 2016

(54) UNIVERSAL NETWORK INTERFACE DEVICE

(75) Inventors: Ted Lichoulas, Simpsonville, SC (US); Eddie Kimbrell, Dacula, GA (US)

(73) Assignee: AFL Telecommunications LLC, Duncan, SC (US)

(*) Notice: Subject to any disclaimer, the term of this patent is extended or adjusted under 35 U.S.C. 154(b) by 0 days.

(21) Appl. No.: 13/700,023

(22) PCT Filed: Jul. 12, 2012

(86) PCT No.: PCT/US2012/046353
§ 371 (c)(1),
(2), (4) Date: Nov. 26, 2012

(87) PCT Pub. No.: WO2013/009931
PCT Pub. Date: Jan. 17, 2013

(65) Prior Publication Data
US 2014/0023126 A1    Jan. 23, 2014

Related U.S. Application Data

(60) Provisional application No. 61/506,783, filed on Jul. 12, 2011, provisional application No. 61/542,578, filed on Oct. 3, 2011.

(51) Int. Cl.
G06F 13/00 (2006.01)
H04Q 1/02 (2006.01)
H04M 3/00 (2006.01)

(52) U.S. Cl.
CPC ............. *G06F 13/00* (2013.01); *H04Q 1/028* (2013.01); *H04M 3/007* (2013.01); *H04Q 2201/10* (2013.01)

(58) Field of Classification Search
None
See application file for complete search history.

(56) References Cited

U.S. PATENT DOCUMENTS

| | | | |
|---|---|---|---|
| 7,031,465 B1* | 4/2006 | Dibble et al. | 379/418 |
| 2002/0065935 A1* | 5/2002 | Koperda et al. | 709/238 |
| 2006/0010000 A1* | 1/2006 | Jauert et al. | 705/1 |
| 2006/0126647 A1* | 6/2006 | Hicks, III | 370/401 |
| 2006/0187954 A1* | 8/2006 | Braschi et al. | 370/463 |
| 2006/0188090 A1* | 8/2006 | Paulsen et al. | 379/413.04 |
| 2006/0192434 A1* | 8/2006 | Vrla et al. | 307/64 |
| 2007/0133621 A1* | 6/2007 | Autere et al. | 370/532 |
| 2007/0160193 A1 | 7/2007 | Vo et al. | |
| 2007/0160195 A1 | 7/2007 | Vo et al. | |
| 2008/0207049 A1 | 8/2008 | Liu et al. | |
| 2009/0060531 A1* | 3/2009 | Biegert et al. | 398/214 |
| 2009/0212971 A1* | 8/2009 | Casey et al. | 340/870.02 |

OTHER PUBLICATIONS

International Search Report for PCT/US2012/046353 dated Oct. 5, 2012.

* cited by examiner

Primary Examiner — Simon Sing
Assistant Examiner — Jeffrey Lytle
(74) Attorney, Agent, or Firm — Dority & Manning, P.A.

(57) ABSTRACT

An universal network interface device with an enclosure, an access module, a modem module, a switching power supply and a battery pack.

4 Claims, 6 Drawing Sheets

UNIVERSAL NETWORK INTERFACE DEVICE

CROSS-REFERENCE TO RELATED APPLICATIONS

This application is a U.S. National Stage application of PCT/US2012/046353, filed Jul. 12, 2012, which claims priority to U.S. Provisional Patent Application Nos. 61/542,578, filed Oct. 3, 2011 and 61/506,783, filed Jul. 12, 2011, the disclosures of which are incorporated by reference herein in their entireties.

BACKGROUND

1. Field

The invention is related to a universal network interface device.

2. Related Art

AT&T's u-Verse and Verizon's FiOS installations require significant work by installation crews to reconfigure the home wiring in order to provide service. One installation crew will need to connect a drop to the customer residence, and install an optical network terminal (ONT) for fiber-based services or install filters in a network interface device (NID) for very high bit rate digital subscriber line (VDSL)-based services. A second installation crew will then need to work inside the customer residence establishing a high data rate pathway to the modem/gateway and reconfigure existing home cabling to provision service from the modem/gateway to the point-of-use. Although this methodology ultimately provide high quality service to the customer, it is labor-intensive and expensive for the service provider.

Additionally, this technical approach is service provider dependent. If a customer makes the decision to switch service, the home cabling will need to be configured from a new home network topology. This "rewiring" is even more time consuming and even more expensive for the service provider.

Therefore, there is a need for an universal modular modem gateway that may meet some of the following objectives: 1. Provide a common base platform for installer; 2. provide a common form factor for the access module (primary service provider/customer premise interface/media conversion); 3. provide a common form factor for the modem module; 4. provide a centralized point from which to distribute signals into the customer residence; 5. provide a clear/simple methodology for technology/platform upgrades; and 6. provide power for the modem and router/gateway from a centralized point.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of the invention is a universal network interface device including: an enclosure; an access module in the enclosure; a modem module attached to the enclosure and electrically connected to the access module; a switching power supply in the enclosure providing power to the modem module; and a battery in the enclosure providing power to the modem module.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings. If the components are the same in different drawings, the same item numbers are used to the extent possible for ease of reference.

This invention is related to U.S. Provisional Patent Application Nos. 61/407,578, filed on Oct. 28, 2010, 61/506,783 filed Jul. 12, 2011 and 61/542,578 filed Oct. 3, 2011 and PCT Application No. PCT/US2011/058310 filed Oct. 28, 2011. The modem module in this application and U.S. Provisional Patent Application No. 61/407,578 are the same and the access PCB board is similar in function to the access module in U.S. Provisional Patent Application No. 61/407,578.

Figure 1:
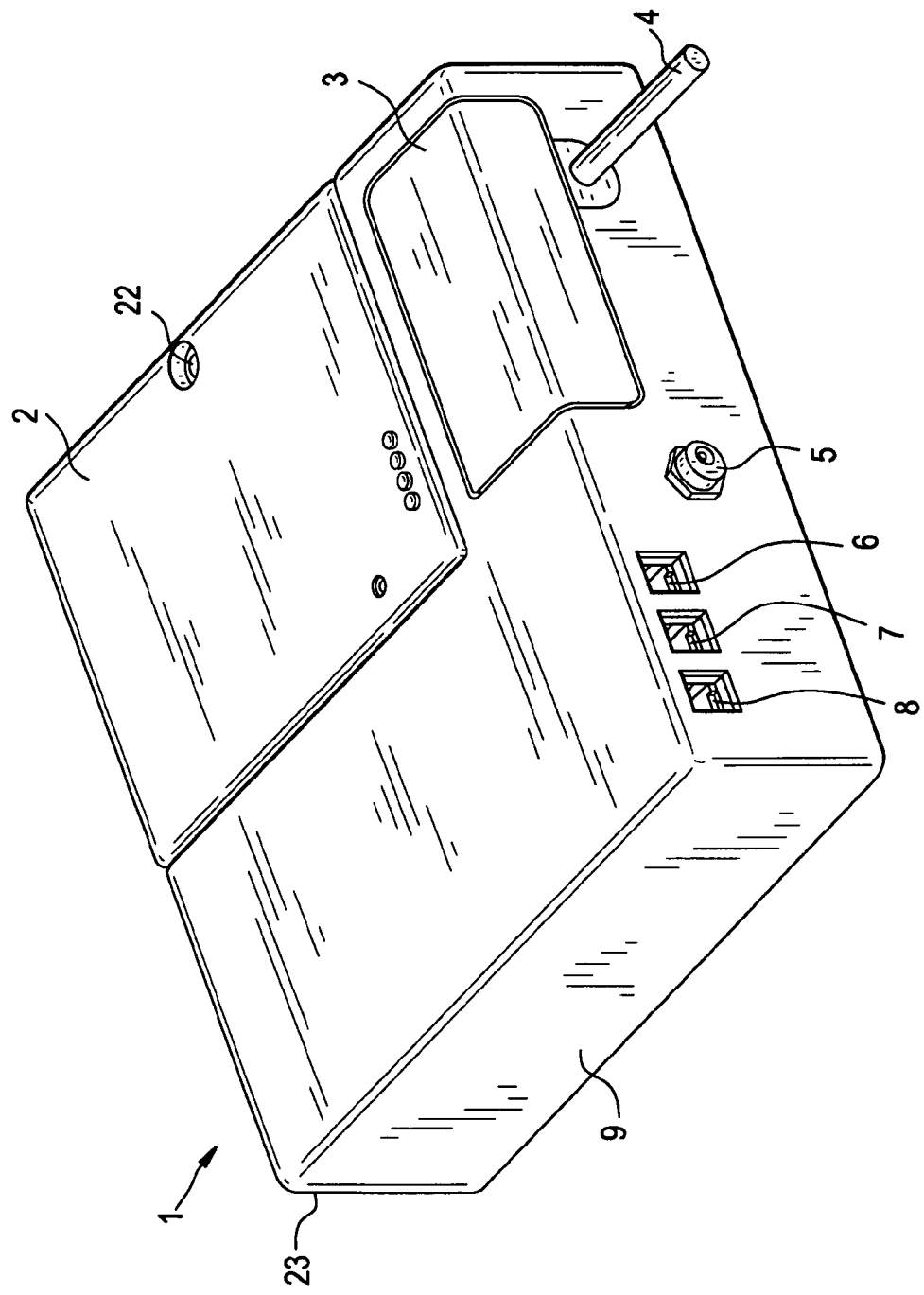
FIG. 1 shows an isometric view of an embodiment of the universal NID.

FIG. 1 shows an isometric view of an embodiment of the universal NID 1. The universal NID 1 includes five main elements, enclosure 23, access module 9, modem module 2, switching power supply 13 and battery pack 16. The modem module 2 may be connected to the enclosure 23 by a bolt 22. The figure shows the external features of the universal NID 1. The universal NID 1 is designed to be installed in the interior of a customer residence in one of three primary configurations. It may be mounted onto a wall (vertical) with the telco input (POTS plus VDSL) 8, residential security service jack 7, premise output (POTS) 6, 12 Vdc power jack 5, and CAT 5 cable to the router/gateway 4 pointed downwards. This is the primary configuration. It can also be placed on top of or mounted beneath a horizontal surface such as a desk and can be placed in an upright stand. However, it could be used in a variety of other applications and locations. The invention is not limited to use in the interior of a customer residence.

The inputs/outputs include: a power in connection 10, such as a 110 V AC 1-phase power connection; a power output 5, such as a 12 V DC 0.8 A (10 W) nominal power jack (for a router/gateway (not shown)); a telco input 8, such as a CAT 3 or CAT 5 cable bi-directionally carrying VDSL and POTS signals; a premise output 6, such as a CAT 3 cable directionally carrying POTS signals; a residential security services jack 7, such as a CAT 3 or CAT 5 connection for residential security; a router/gateway input/output 4, such as a CAT 5 cable connection bi-directionally carrying Ethernet signals (to/from a router/gateway).

The dimensions of this embodiment of the universal NID 1 are approximately 9 inches by 9 inches by 2.5 inches.

Figure 2:
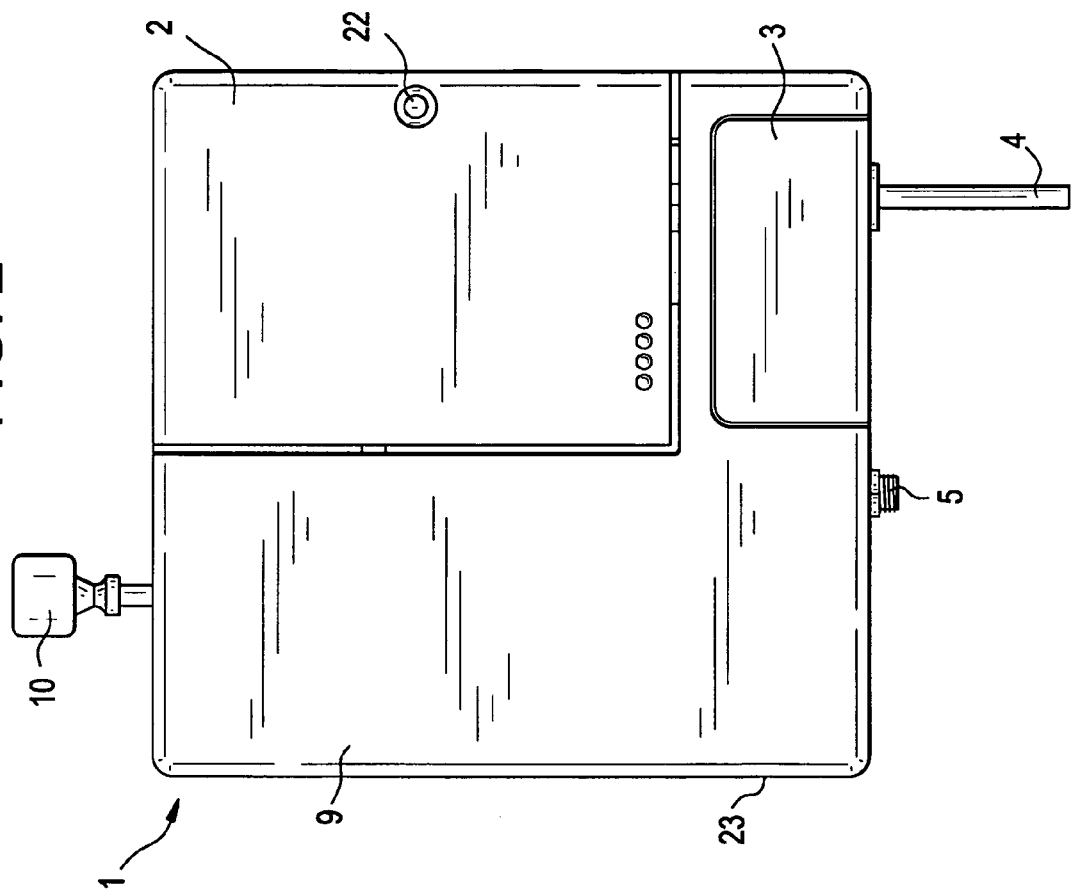
FIG. 2 shows a plan view of an embodiment of the universal NID.

FIG. 2 shows a plan view of an embodiment of the universal NID 1. Since the universal NID is designed to be mounted on an interior wall of a customer's residence, it is designed to minimize excess visible wiring. As a result, a cord storage well has been built into the upper left-hand corner of the universal NID 1 to hold extra power cord length.

Figure 3:
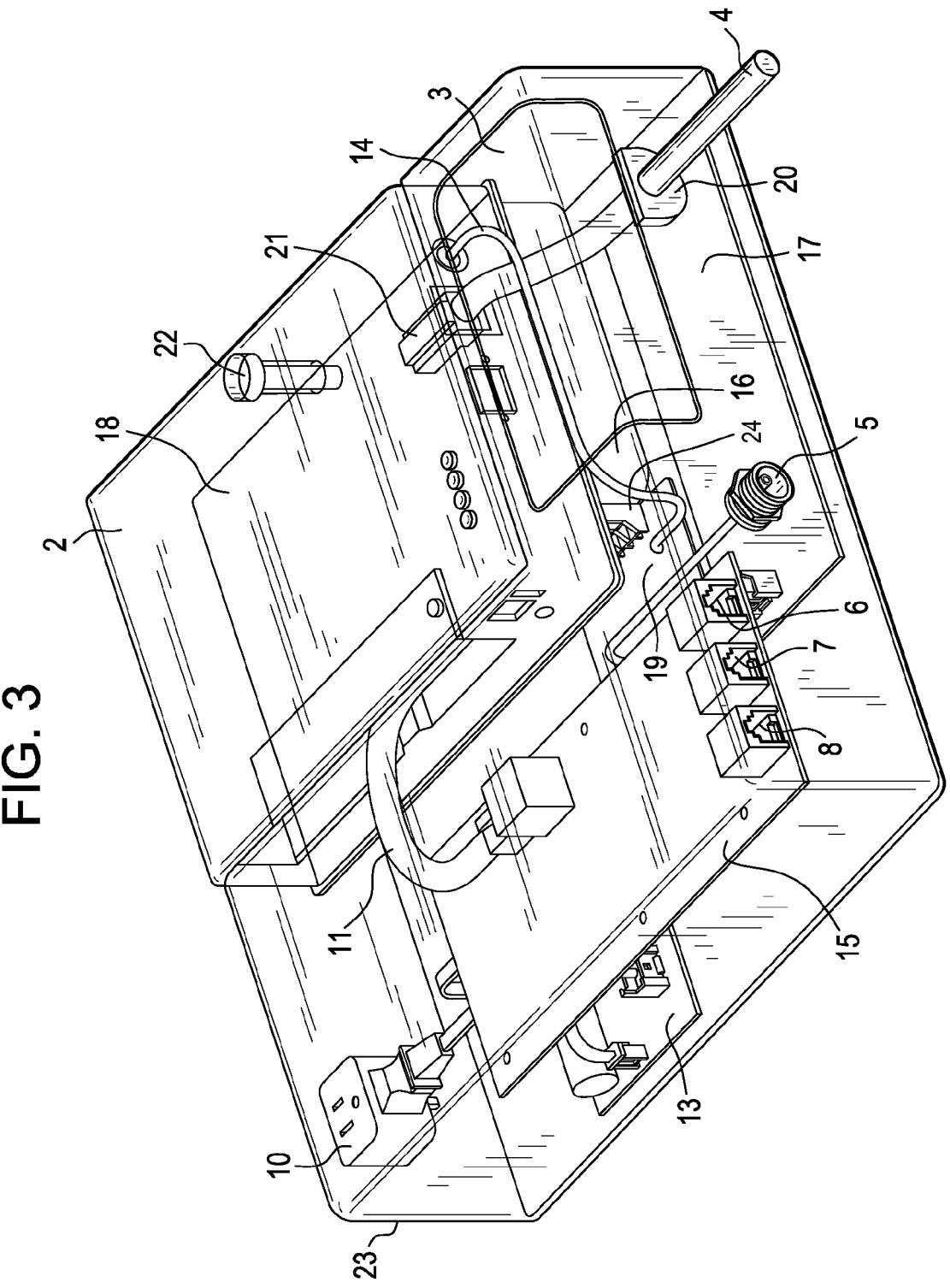
FIG. 3 shows a transparent isometric view of an embodiment of the universal NID.

FIG. 3 shows a transparent isometric view of an embodiment of the universal NID 1. The figure shows an internal view. Key components include: a modem module PCB 18, the function of which is to decode a downstream VDSL2 input signal from the access module 9 and transmit to the router/gateway, convert an Ethernet signal from the router/gateway input VDSL format and transit to the telco central office via the access module PCB 15. The power is a 12 V DC plug from the power management PCB 19. The input/output is a CAT 5 cable 4 to/from the router/gateway. To install the cable, a modem WAN jack access cover 3 is removed, and CAT 5 is inserted through a grommet 20 and plugged into a modem Ethernet jack 21. The modem WAN jack access cover 3 is reinstalled after connection to the modem is made. Regarding interconnect, the modem module PCB 18 is connected to the access module PCB 15 with a CAT interconnect cable 11.

A 20 W 110 V AC to 12 V DC switching power supply 13, with an input of a 110 V AC 1-phase power supply and an output of 12 V DC. This node is connected to the battery pack 16 and two 12 V DC power cords. One 12 V DC power cord 14 is connected to the modem module 2. The second 12 V DC power cord is connected to the 12 V DC power jack 5 which will power the router/gateway.

The access PCB 15, may include different configurations, such as a 1 line VDSL module and a 2 line VDSL module. The function of the access PCB 15 is to de-multiplex/multiplex POTS and VDSL signals. The input 8 is a CAT 3 cable from the telco connected to the telco input. The output 6 is a CAT 3 cable to premise for phone service. Regarding interconnect, the modem module PCB 18 is connected to the access module PCB 15 with a CAT 5 interconnect cable 11. Also, a residential security services jack and switch 7 are provided to connect to home security services.

A power management PCB 19 connects the output of 20 W 110 V AC to a 12 V DC switching power supply 13 and output of battery 16 to two 12 V DC cords.

A battery pack 16 provides back-up 5000 M-Ah stored power to the modem module and any other externally connected devices in event of power loss. It may be a Li-Ion or Ni-Cad typical cell type, among other types.

A LAN interface PCB 17, the function of which is to provide means to the distribute Ethernet output of the modem within the residence using a HPNA or G.Hn protocol. In this embodiment, a G.Hn configuration is shown.

Figure 4:
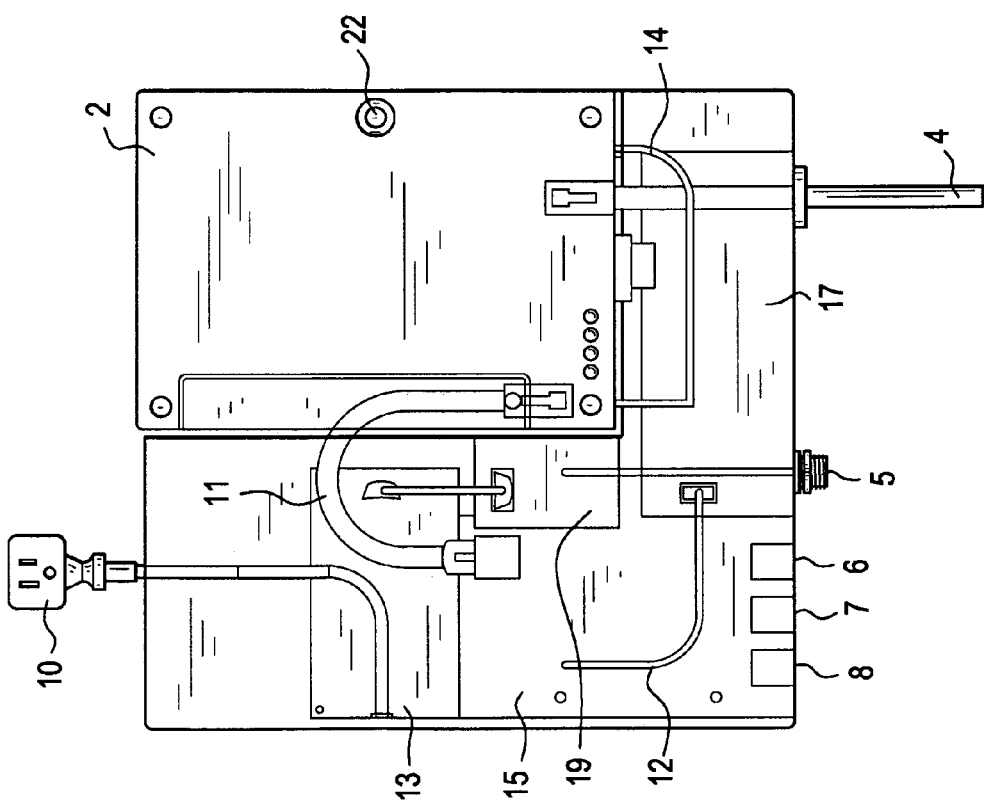
FIG. 4 shows a plan view of an embodiment of the universal NID with the case suppressed and printed circuit boards (PCBs) and interconnects highlighted.

FIG. 4 shows a plan view of an embodiment of the universal NID with the case suppressed and printed circuit boards (PCBs) and interconnects highlighted. The Figure provides a clearer picture of connections between PCBs. The 20 W 110 V AC to 12 V DC switching power supply 13 and power management PCB 19 can be combined, and the LAN interface PCB 17 may have multiple configurations. The two most common are a G.Hn PCB and HPNA PCB.

Figure 5:
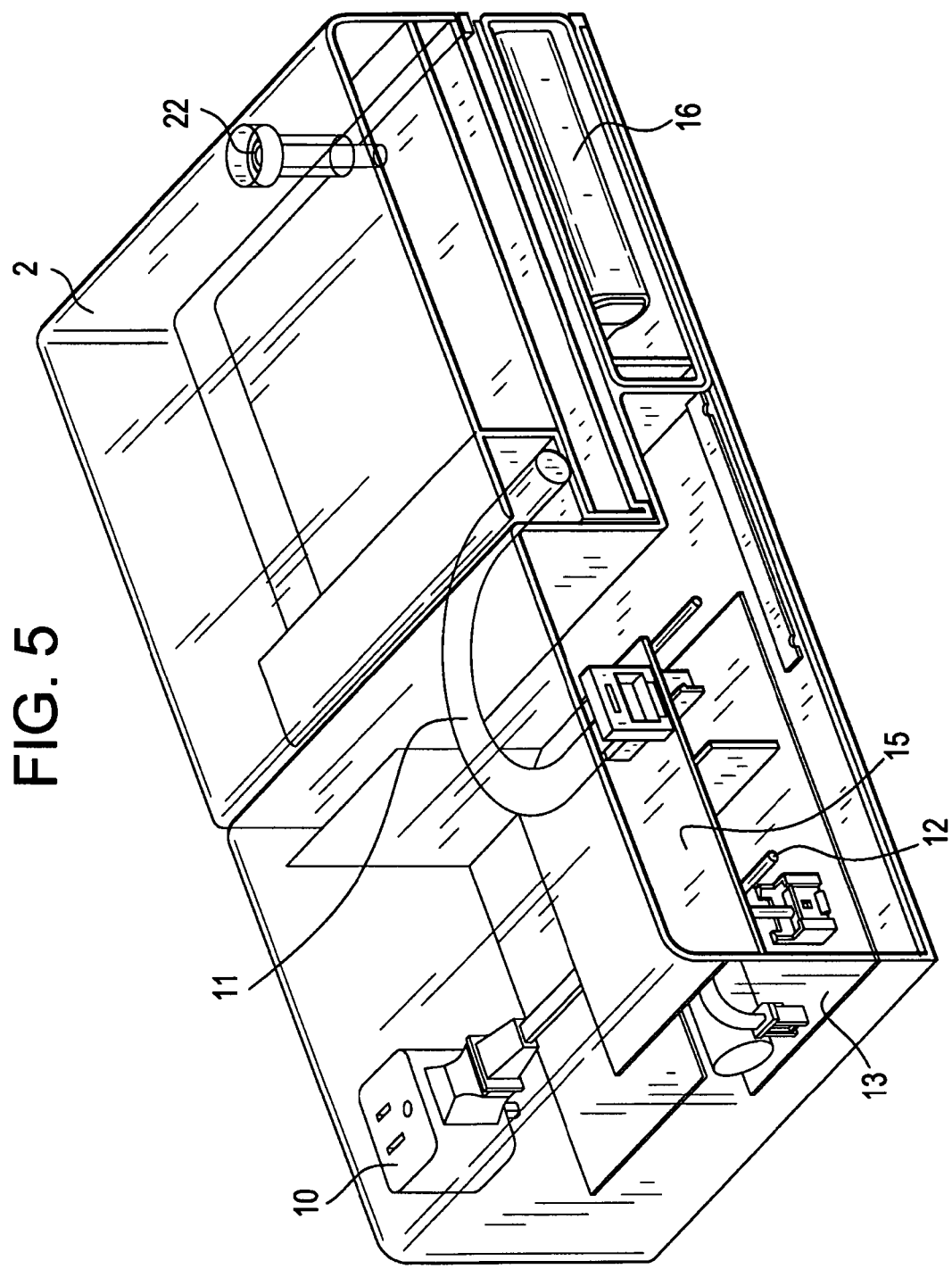
FIG. 5 shows an isometric cross sectional view of an embodiment of the universal NID with the battery pack placement below the modem module.

FIG. 5 shows an isometric cross sectional view an embodiment of the universal NID 1 with the battery pack 16 placement below the modem module 2. The battery pack 16 is designed to be installed from the right side and snap in place. The battery pack 16 is electrically connected to the power management PCB 19 via a connector, such as a Hirose battery connector 24. Currently, in the US, the battery and modem are separate units (not combined in one integrated housing).

Figure 6:
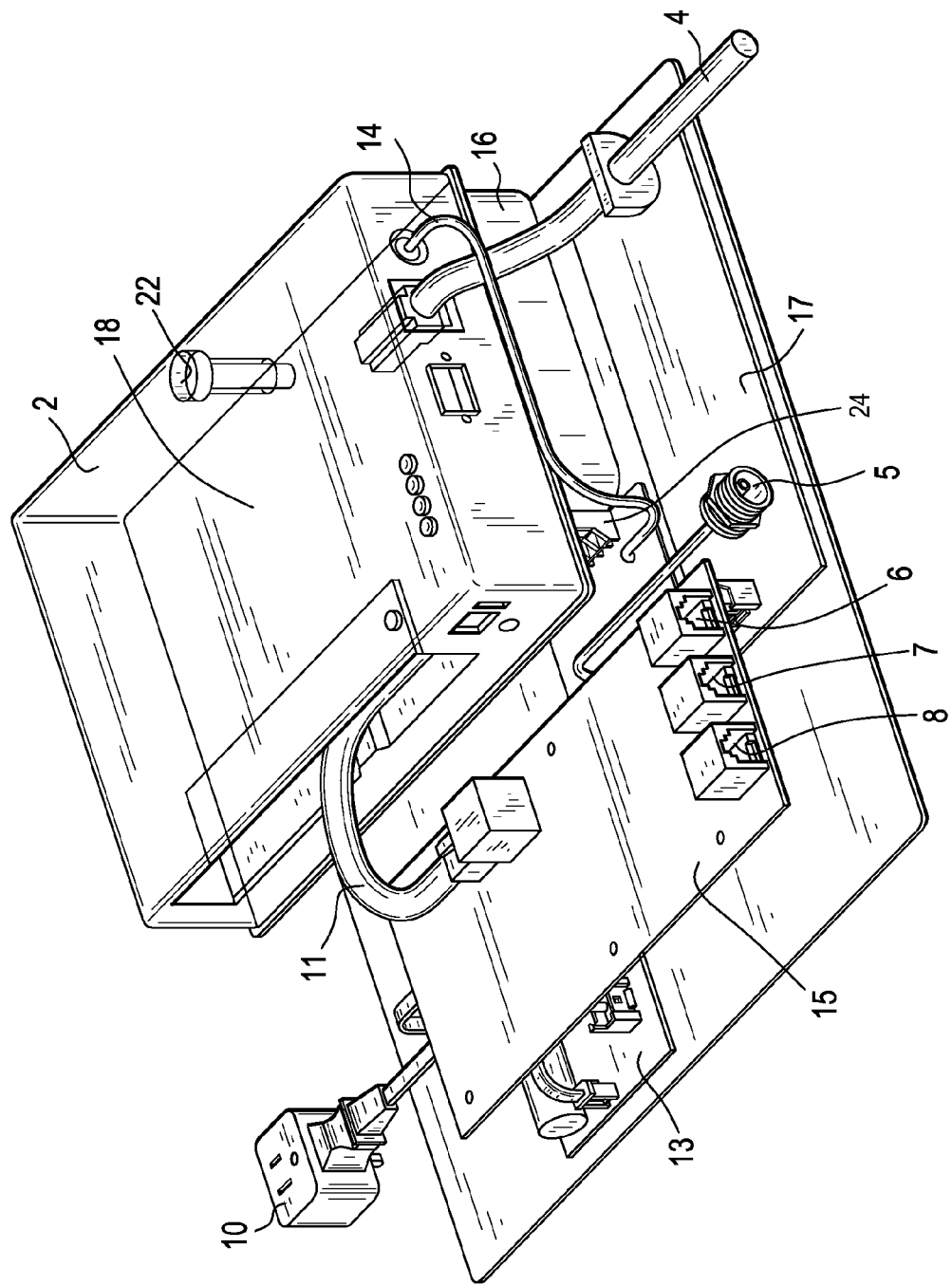
FIG. 6 shows an isometric cross sectional view of an embodiment of the universal NID with the case suppressed.

FIG. 6 shows an isometric cross sectional view of an embodiment of the universal NID with the case suppressed.

Some benefits and advantages of the invention include, but are not limited to:

1. Common platform.
2. Modular construction—uses same modem PCB and access module PCB base PCB as a typical outdoor unit.
3. Uses off the shelf power supply.
4. The battery pack is integral to the NID, as opposed to being a separate unit.
5. Common platform—common field practice for installation.
6. The modem module can be removed and replaced by customer—no truck rolls.
7. The battery pack can be removed and replaced by customer—no truck rolls.
8. The architecture separates the modem and router/gateway. Thus, the modem stays permanently installed in residence and allows telco service providers to push updates easily to the system and measure QoS data.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A universal network interface device comprising:
   an enclosure;
   an access module contained in said enclosure which receives an input signal, de-multiplexes or multiplexes said input signal, outputs a premise signal, and transmits said input signal to a modem module;
   said modem module contained in a housing externally attached to said enclosure and electrically connected to said access module, wherein said modem module decodes said input signal transmitted from said access module and is configured to transmit the decoded signal to an external router, and said modem module converts a signal received from said router to another format for transmitting via said access module;
   a switching power supply contained in said enclosure providing power to said modem module;
   a battery removably attached in said enclosure and removably and electrically connected to said modem module providing power to said modem module; and
   said router physically separately disposed from said enclosure and said modem module,
   wherein said access module comprises an access module circuit board and a LAN interface circuit board, and
   said switching power supply comprises a switching power supply circuit board and a power management circuit board.

2. The universal network interface of claim 1, wherein said modem module is removably attached to said enclosure.

3. The universal network interface of claim 2, wherein said modem module is removably attached to said enclosure by a bolt.

4. The universal interface of claim 1, wherein said switching power supply provides power to said external router.

* * * * *